(12) United States Patent
Yokoyama

(10) Patent No.: US 10,760,632 B2
(45) Date of Patent: Sep. 1, 2020

(54) BRAKE DISC AND METHOD OF PRODUCING THE SAME

(71) Applicant: TOYOTA JIDOSHA KABUSHIKI KAISHA, Toyota-shi, Aichi-ken (JP)

(72) Inventor: Tomohiro Yokoyama, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 7 days.

(21) Appl. No.: 16/155,924

(22) Filed: Oct. 10, 2018

(65) Prior Publication Data

US 2019/0162261 A1 May 30, 2019

(30) Foreign Application Priority Data

Nov. 24, 2017 (JP) .................. 2017-226110

(51) Int. Cl.
*F16D 65/12* (2006.01)
*B21K 1/32* (2006.01)
(Continued)

(52) U.S. Cl.
CPC .............. *F16D 65/123* (2013.01); *B21J 5/12* (2013.01); *B21K 1/32* (2013.01); *B21K 23/00* (2013.01); *B23K 20/12* (2013.01); *B23K 20/121* (2013.01); *B23K 20/129* (2013.01); *B23K 20/227* (2013.01); *B23K 20/24* (2013.01); *B23K 33/006* (2013.01); *B23K 33/008* (2013.01); *F16D 65/125* (2013.01); *B23K 2101/006* (2018.08); *B23K 2101/04* (2018.08); *B23K 2103/05* (2018.08); *F16D 65/128* (2013.01); *F16D 2065/132* (2013.01);
(Continued)

(58) Field of Classification Search
CPC ....... F16D 65/12; F16D 65/123; F16D 65/125
USPC ............. 188/218 XL, 18 A, 264 A, 264 AA; 29/428, 458
See application file for complete search history.

(56) References Cited

U.S. PATENT DOCUMENTS 2,243,334 A * 5/1941 Eksergian ............. F16D 65/123
188/218 XL
4,448,291 A * 5/1984 Ritsema ................ F16D 65/128
188/218 XL
(Continued)

FOREIGN PATENT DOCUMENTS

JP 2004-530848 A 10/2004
JP 2010-106917 A 5/2010

*Primary Examiner* — Christopher P Schwartz
(74) *Attorney, Agent, or Firm* — Sughrue Mion, PLLC

(57) ABSTRACT

A brake disc to be mounted on an axle hub, including sliding surfaces with which friction members respectively come into a sliding contact and which face in mutually opposite directions, wherein the brake disc includes: a first member having a disc-like shape and including a mount portion through which the brake disc is mounted on an axle hub and a radially outer portion located radially outward of the mount portion, one of the sliding surfaces being formed on the radially outer portion; and a second member having a doughnut plate shape, the other of the sliding surfaces being formed on the second member, and wherein the first member and the second member are bonded through a protruding portion formed on one of the radially outer portion of the first member and the second member and protruding toward the other of the radially outer portion and the second member.

6 Claims, 6 Drawing Sheets

(51) Int. Cl.
- *B23K 20/12* (2006.01)
- *B21K 23/00* (2006.01)
- *B23K 33/00* (2006.01)
- *B23K 20/24* (2006.01)
- *B21J 5/12* (2006.01)
- *B23K 20/227* (2006.01)
- *B23K 103/04* (2006.01)
- *F16D 65/02* (2006.01)
- *F16D 65/78* (2006.01)
- *B23K 101/00* (2006.01)
- *B23K 101/04* (2006.01)

(52) U.S. Cl.
CPC ............ *F16D 2065/1328* (2013.01); *F16D 2065/1384* (2013.01); *F16D 2065/788* (2013.01); *F16D 2200/0021* (2013.01); *F16D 2250/0023* (2013.01); *F16D 2250/0076* (2013.01)

(56) References Cited

U.S. PATENT DOCUMENTS

| | | | | |
|---|---|---|---|---|
| 4,821,860 | A | * | 4/1989 | Crawford ............... F16D 13/64 188/218 XL |
| 5,271,488 | A | * | 12/1993 | Cooke .................... F16D 13/64 188/218 XL |
| 5,509,510 | A | * | 4/1996 | Ihm ....................... F16D 65/125 164/112 |
| 9,016,445 | B2 | * | 4/2015 | Hanna .................... F16D 65/12 188/218 XL |
| 2004/0182660 | A1 | | 9/2004 | Cavagna et al. |
| 2007/0023242 | A1 | | 2/2007 | Krueger et al. |
| 2009/0022938 | A1 | * | 1/2009 | Hanna ................. F16D 65/0006 428/101 |
| 2009/0260932 | A1 | * | 10/2009 | Hanna ...................... F16F 7/01 188/218 XL |
| 2016/0160948 | A1 | * | 6/2016 | Wagner ................ F16D 65/123 188/218 XL |

\* cited by examiner

FIG.8A
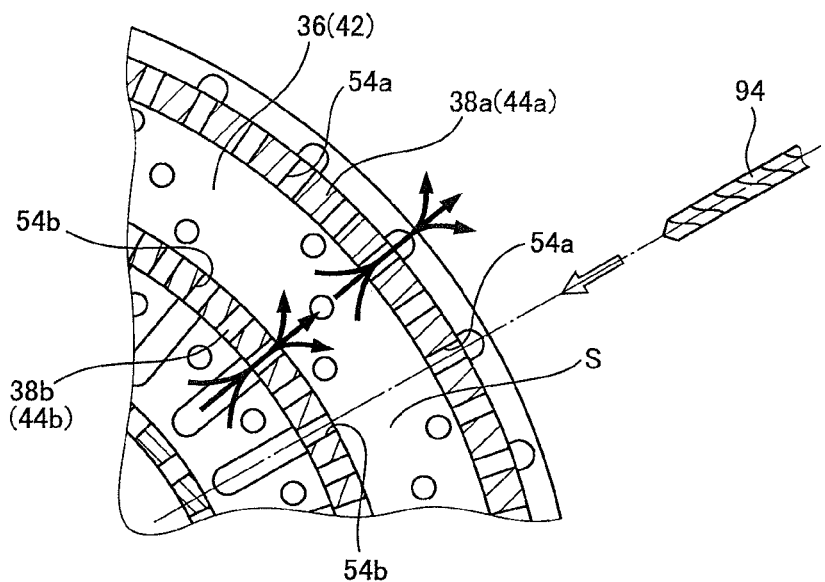
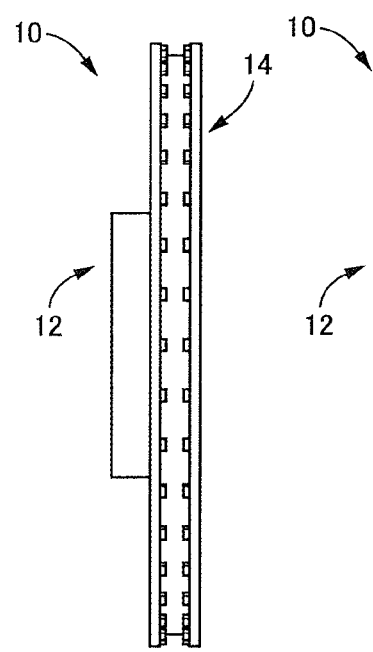
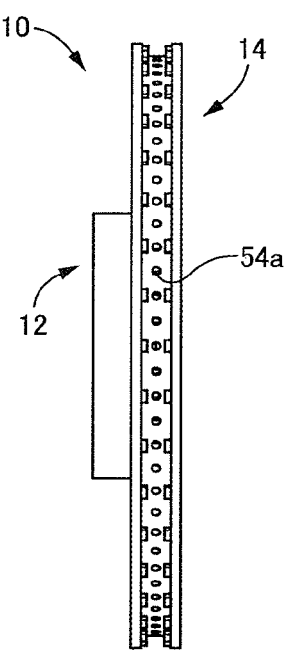
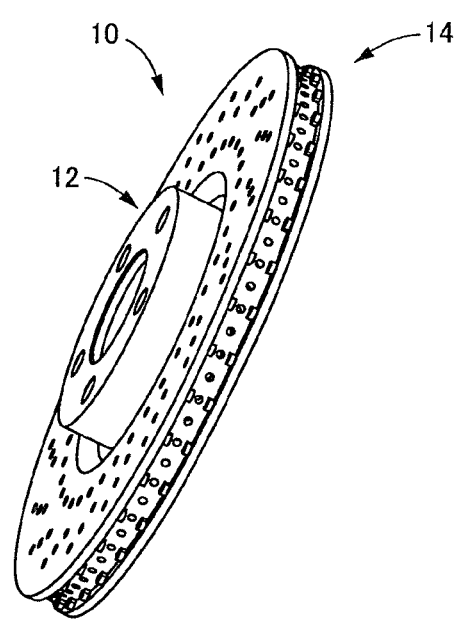
FIG.8B     FIG.8C     FIG.8D

BRAKE DISC AND METHOD OF PRODUCING THE SAME

CROSS REFERENCE TO RELATED APPLICATION

The present application claims priority from Japanese Patent Application No. 2017-226110, which was filed on Nov. 24, 2017, the disclosure of which is herein incorporated by reference in its entirety.

BACKGROUND

Technical Field

The following disclosure relates to a brake disc for a vehicle brake device and a method of producing the brake disc.

Description of Related Art

A disc brake device is typically used as a vehicle brake device. The disc brake device includes, for instance, a brake disc or a disc rotor that rotates with a wheel, brake pads each as a friction member, and a caliper holding the brake pads and configured to push the brake pads onto the brake disc. To meet a demand for a weight reduction of the brake disc, brake discs as described in Japanese Patent Application Publication (Translation of PCT Application) No. 2004-530848 and Japanese Patent Application Publication No. 2010-106917 have been proposed.

SUMMARY

The brake discs described above include a mount portion through which the brake disc is mounted on an axle hub configured to hold a wheel. The mount portion is fastened to a sliding portion which is located radially outward of the mount portion and onto which the friction members are to be pushed. (The mount portion is shaped like a hat and also referred to as a hat portion.) The thus formed brake discs are not satisfactory in terms of utility because the number of constituent components is inevitably large and a cumbersome fastening work is needed. Accordingly, the present disclosure relates to a brake disc having high utility.

One aspect of the disclosure is directed to a brake disc to be mounted on an axle hub, the brake disc including a pair of sliding surfaces with which friction members respectively come into a sliding contact and which face in mutually opposite directions, wherein the brake disc includes: a first member formed in a disc-like shape and including i) a mount portion through which the brake disc is mounted on the an axle hub and ii) a radially outer portion located radially outward of the mount portion, one of the sliding surfaces being formed on the radially outer portion; and a second member formed in a doughnut plate shape, the other of the sliding surfaces being formed on the second member, and wherein the first member and the second member are bonded to each other through a protruding portion formed on one of the radially outer portion of the first member and the second member and protruding toward the other of the radially outer portion of the first member and the second member.

Another aspect of the disclosure is directed to a method of producing a brake disc to be mounted on an axle hub, the brake disc including a pair of sliding surfaces with which friction members respectively come into a sliding contact and which face in mutually opposite directions, the method including: a first forging step of forging a first member having a disc-like shape and including i) a mount portion through which the brake disc is mounted on the an axle hub and ii) a radially outer portion located radially outward of the mount portion, one of the sliding surfaces being formed on the radially outer portion; a second forging step of forging a second member having a doughnut plate shape, the other of the sliding surfaces being formed on the second member; and a bonding step of bonding the first member and the second member, wherein, in at least one of the first forging step and the second forging step, a protruding portion is formed on one of the radially outer portion of the first member and the second member, so as to protrude toward the other of the radially outer portion of the first member and the second member, and wherein, in the bonding step, the first member and the second member are bonded to each other through the protruding portion.

Advantageous Effects

According to the brake disc constructed as described above, it is possible to reduce the thickness of each of the first member and the second member. The first member and the second member having such a small thickness are bonded, resulting in a sufficient weight reduction of the brake disc. Further, the sliding portion is formed by bonding the first member and the second member through the protruding portion, so that a demand for an increase in the thickness of the sliding portion can be satisfied. Moreover, the number of components can be reduced in the brake disc of the present disclosure, as compared with the conventional brake discs in which the constituent members are fastened as described above.

According to the method of producing the brake disc of the present disclosure, the brake disc can be simply produced without performing casting and fastening.

Various Forms

The brake disc according to the present disclosure (hereinafter referred to as "the present brake disc" where appropriate) may be formed of any suitable material. While the brake disc is typically formed of cast iron, it is preferable that the brake disc be formed of stainless steel, for instance, for rust prevention. Stainless steel has higher strength than carbon steel, and use of stainless steel enables a reduction in the thickness of the first member and the second member. Thus, a further weight reduction of the brake disc is achieved.

The first member includes the mount portion and the radially outer portion which are formed integrally with each other. The first member is preferably formed of a single material. Considering ease of installation of the present brake disc on the axle hub, the mount portion is preferably shifted in an axial direction of the brake disc with respect to the radially outer portion. In this case, the first member is formed in what is called a hat-like shape. The axial direction of the brake disc will be hereinafter simply referred to as the "axial direction" where appropriate.

A plate-like portion of each of the first member and the second member on which the sliding surface is formed is referred to as a "plate portion". The protruding portion is a portion that protrudes in the axial direction from the plate portion of the first member toward the second member or a portion that protrudes in the axial direction from the plate portion of the second member toward the first member. The protruding portion has a function as a spacer (spacer function) for providing a space between the plate portions of the respective first and second members. The protruding portion may be provided only for the first member or only for the second member. Alternatively, the protruding portion may be provided for both of the first member and the second member. In view of the spacer function, the protruding portion is preferably formed over an entire circumference of the plate portion. In this case, the protruding portion may be constituted by an annular protrusion that continuously extends along one circle or by a plurality of protrusions formed along one circle so as to be spaced apart from one another. The sliding surface of the brake disc has a certain degree of a dimension (width) in the radial direction of the brake disc. Thus, in the case where the annular protrusion is employed as the protruding portion, it is preferable to form a plurality of annular protrusions with mutually different diameters. In the case where the plurality of mutually-spaced-apart protrusions are employed as the protruding portion, it is preferable to form the mutually-spaced-apart protrusions along each of a plurality of circles with mutually different diameters.

In the present disc brake, the first member and the second member are bonded to each other through the protruding portion. This feature means that the first member and the second member are bonded at the protruding portion. Specifically, the feature means that a protruding end of the protruding portion formed on one of the first member and the second member is bonded to the plate portion of the other of the first member and the second member, for instance. Further, in the case where the protruding portion is formed on both of the first member and the second member, the feature means that protruding ends of the respective protruding portions of the first and second members are bonded. In the case where the bonding is performed by heat bonding such as welding, it is needed to take account of an influence on the plate portion due to a heat (such as heat strain) by heat bonding. In view of this, it is preferable to form the protruding portions respectively on the first member and the second member at mutually facing positions thereof and to bond the protruding end of the protruding portion of the first member and the protruding end of the protruding portion of the second member to each other. This configuration is preferable because a bonded portion (protruding ends) at which the first member and the second member are bonded is apart from the plate portions of both of the first and second members and the plate portions of the first and second members are accordingly less likely to be directly influenced by the heat.

In terms of the strength, the bonding of the first member and the second member is preferably performed such that the two members become integral into a seamless one-piece member. In this sense, it is preferable to employ welding, diffusion welding or the like, for bonding the first member and the second member. In the case where the bonding is performed by welding, electric welding (resistance welding) such as flash butt welding or stud welding may be employed. It is, however, preferable to employ friction welding considering the circular plate shape of each of the first member and the second member and reliability of the strength at the bonded portion, for instance. Friction welding may be performed according to the following process, for instance. Initially, the first member and the second member are coaxially disposed so as to face each other. In a state in which the protruding portion of one of the first member and the second member is held in contact with the plate portion of the other of the first member and the second member or in a state in which the protruding portions of the respective first and second members are held in contact with each other, the first member and the second member are rotated relative to each other at a high speed. The contacting portion of the first member and the second member is softened or molten at an extremely small portion by a frictional heat generated by the high-speed rotation. At a time point when the contacting portion is softened or molten, the relative rotation of the first member and the second member is stopped and the two members are pressed toward each other, so as to solidify the softened or molten portion.

In the case where the protruding portion is formed over the entire circumference of the plate portion, a space is defined by the protruding portion and the plate portions of the respective first and second members. The brake disc is heated to considerably high temperatures due to heat generated during braking, and it is thus desirable to emit the heated air in the space to the exterior with high efficiency. To this end, it is desirable to form the heat dissipation holes through the protruding portion in the radial direction over the entire circumference of the brake disc. The heat dissipation holes may be formed by drilling after the first member and the second member have been bonded. In the case where the protruding portion is constituted by the annular protrusion described above, a plurality of notches (cutouts) may be formed at the protruding end of the protrusion over the entire circumference so as to be spaced apart from one another. In this configuration, the notches function as the heat dissipation holes after the first member and the second member have been bonded. In the case where the protruding portion is constituted by the plurality of protrusions arranged along one circle so as to be spaced from one another as described above, a space between any adjacent two of the plurality of protrusions functions as the heat dissipation hole.

The first member and the second member desirably have a relatively small thickness. In view of this, the first member and the second member are produced by not casting but forging according to the producing method of the present disclosure. In view of forming accuracy, the first member and the second member are preferably formed by press forging using dies. Press forging enables the first member and the second member to be easily and speedily formed from a circular plate-like blank. The protruding portion is formed on at least one of the first member and the second member. When the first member and the second member are formed by forging, it is expected that a portion at which the protruding portion is formed will have a larger thickness than that of the blank. Thus, in view of a plastic flow of the blank in forging, hot forging is preferably employed. The bonding of the first member and the second member is preferably performed by friction welding for the reasons described above.

BRIEF DESCRIPTION OF THE DRAWINGS

The objects, features, advantages, and technical and industrial significance of the present disclosure will be better understood by reading the following detailed description of one embodiment, when considered in connection with the accompanying drawings, in which:

FIGS. 8A-8D are views for explaining a drilling step of drilling heat dissipation holes in a bonded portion at which a protruding portion of the first member and a protruding portion of the second member are bonded.

DETAILED DESCRIPTION OF THE EMBODIMENT

Figure 1A:
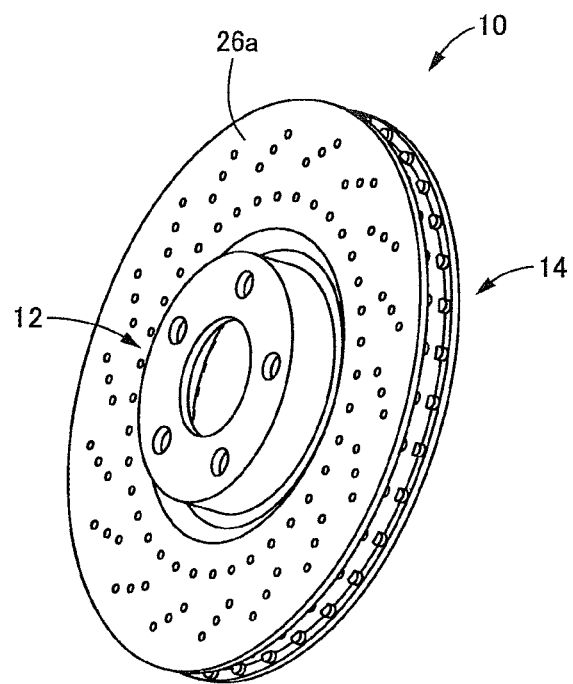
FIGS. 1A and 1B are perspective views of an external appearance of a brake disc according to one embodiment.

Referring to the drawings, a brake disc and a method of producing the brake disc according to one embodiment of the present disclosure will be explained below in detail. It is to be understood that the disclosure is not limited to the details of the following embodiment but may be embodied with various other changes and modifications based on the knowledge of those skilled in the art.

[A] Overall Structure of Brake Disc and how Brake Disc is Used

Figure 1B:
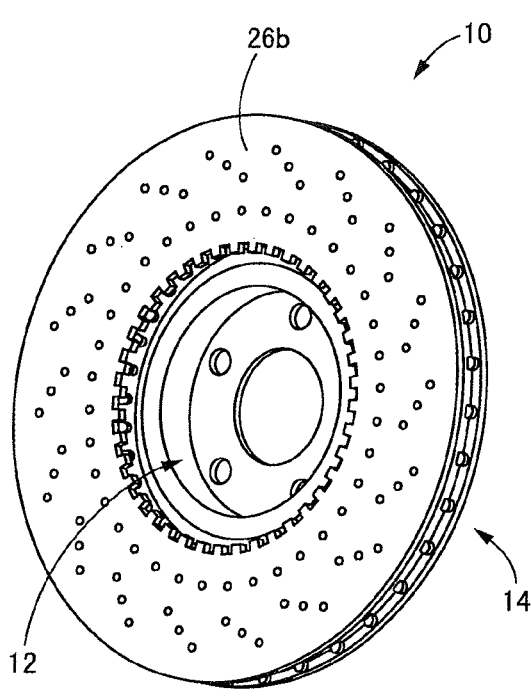

As shown in FIG. 1, a brake disc 10 according to the present embodiment is shaped like a disc formed of stainless steel and having a generally hat-like shape. FIGS. 1A and 1B are perspective views of the brake disc 10 as seen respectively from an outer side and an inner side of a vehicle in a state in which the brake disc 10 is installed on the vehicle. The brake disc 10 includes: a mount portion 12 located at its radially central portion; and a sliding portion 14 located radially outward of the central portion and having a doughnut-like shape.

Figure 2:
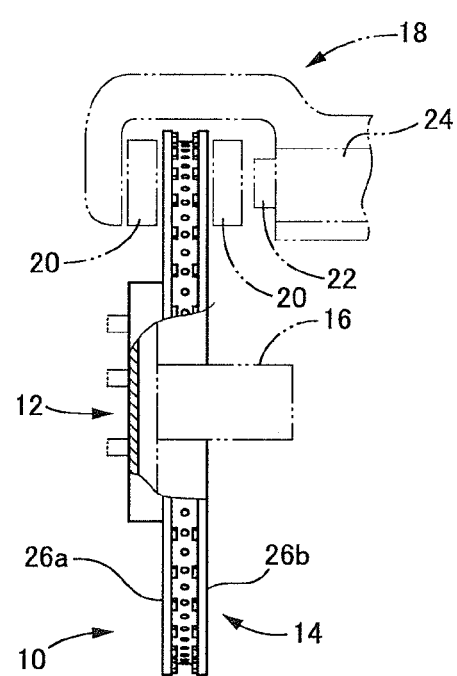
FIG. 2 is a schematic view showing a state in which the brake disc according to the embodiment is installed on a vehicle.

As schematically shown in FIG. 2, the brake disc 10 is attached, at the mount portion 12, to an axle hub 16 for holding a wheel, such that the brake disc 10 is mounted on the axle hub 16 together with the wheel. On a carrier (not shown) rotatably holding the wheel, a brake caliper 18 is disposed so as to straddle the sliding portion 14. The brake caliper 18 holds a pair of brake pads 20, each as a friction member, between which the sliding portion 14 is sandwiched. The brake caliper 18 includes a piston 22 and an actuator 24 configured to advance and retract the piston 22. When the piston 22 is advanced, the brake pads 20 are pushed onto respective surfaces of the sliding portion 14, so that a wheel braking force that depends on friction is generated by the pushing. The surfaces of the sliding portion 14 which face in mutually opposite directions and on which the brake pads 20 are respectively pushed function as sliding surfaces 26. In the following explanation, the two sliding surfaces 26 are distinguished from each other when necessary. Specifically, one of the two sliding surfaces 26 located on the outer side of the vehicle in a width direction of the vehicle is referred to as a sliding surface 26a, and the other of the two sliding surfaces 26 located on the inner side of the vehicle in the width direction of the vehicle is referred to as a sliding surface 26b.

Figure 3:
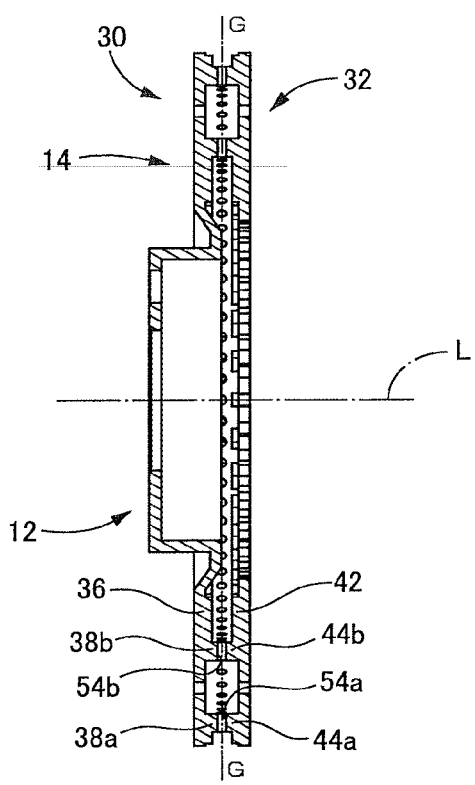
FIG. 3 is a cross-sectional view of the brake disc according to the embodiment.
Figure 4A:
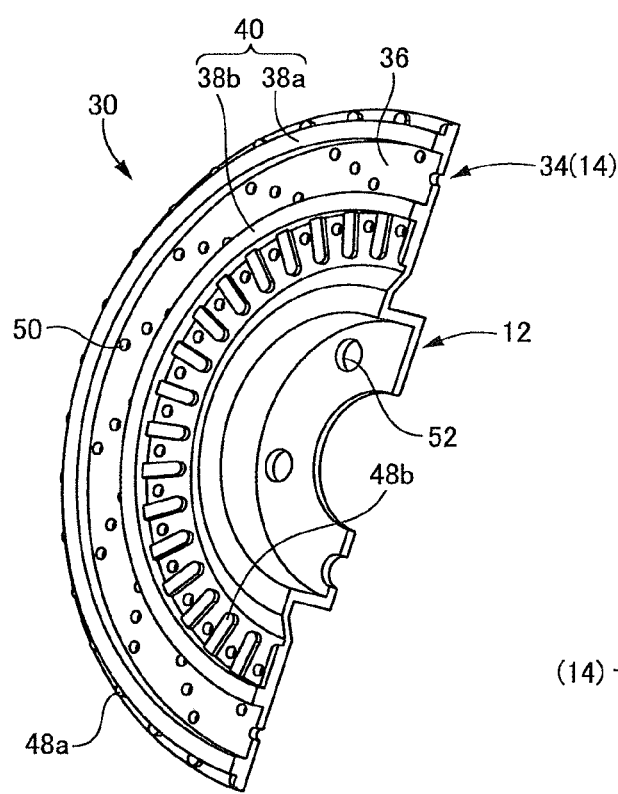
FIGS. 4A and 4B are perspective views respectively showing a first member and a second member which are to be bonded to provide the brake disc according to the embodiment.
Figure 4B:
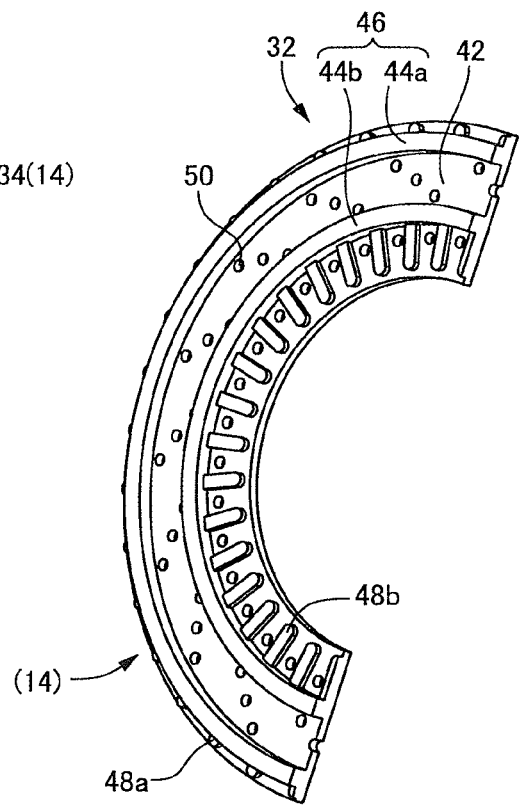

FIG. 3 is a cross-sectional view of the brake disc 10 taken along a plane including an axis L of the brake disc 10. The brake disc 10 is formed by bonding a first member 30 and a second member 32 which are two portions obtained by dividing the brake disc 10 on a plane G-G in FIG. 3. Each of the first member 30 shown in FIG. 4A and the second member 32 shown in FIG. 4B is seen from a bonding side. FIGS. 4A and 4B respectively show the first member 30 and the second member 32 each cut in half on the plane including the axis L. The plane G-G in FIG. 3 is a plane in which is included a center of the sliding portion 14 in its thickness direction.

[B] Structure of First Member and Second Member

Figure 5A:
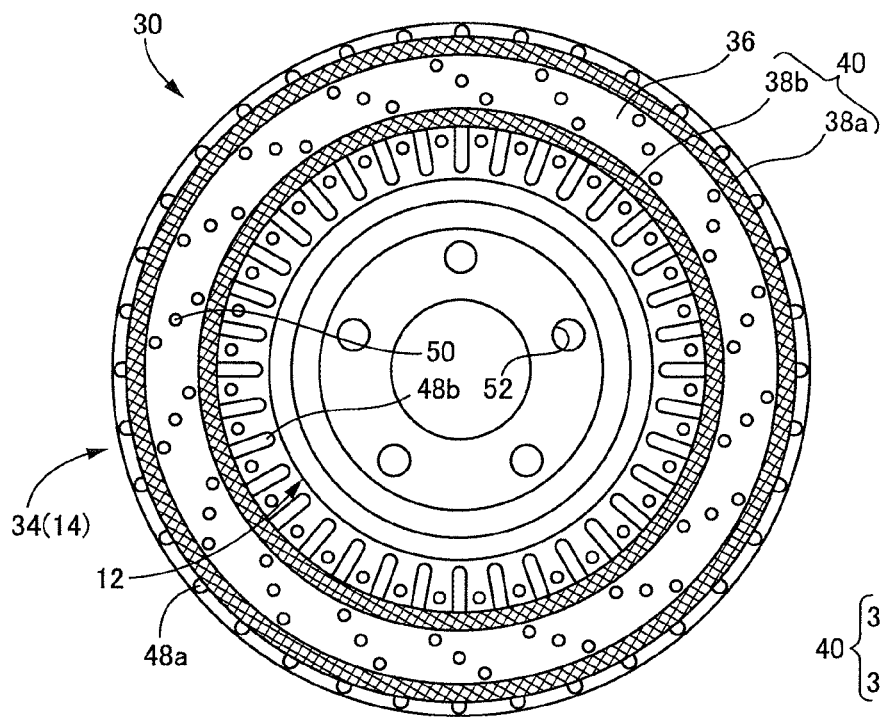
FIG. 5A is a rear view of the first member and FIG. 5B is a cross-sectional view of the first member.
Figure 5B:
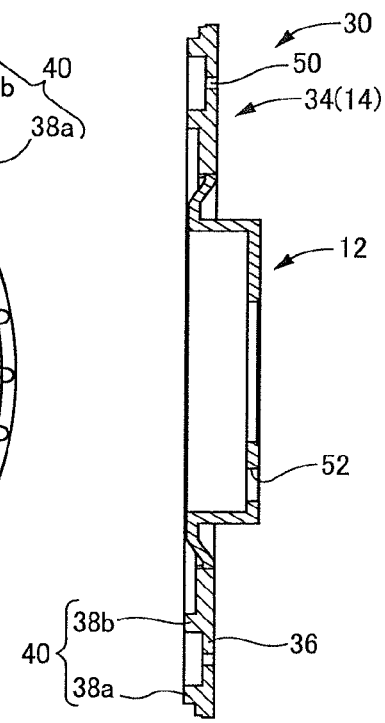
Figure 6A:
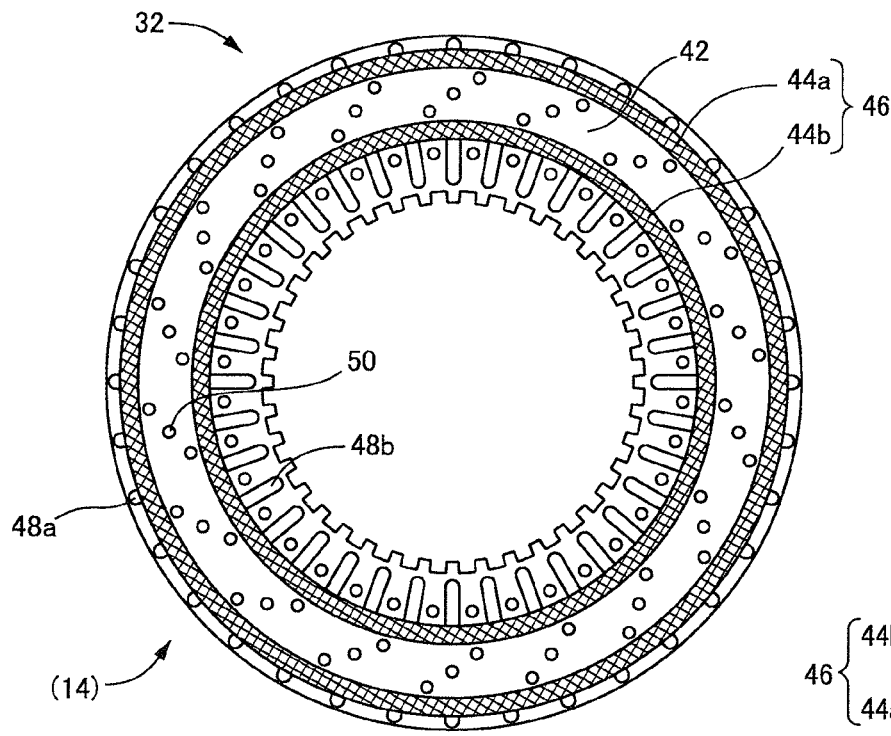
FIG. 6A is a rear view of the second member and FIG. 6B is a cross-sectional view of the second member.
Figure 6B:
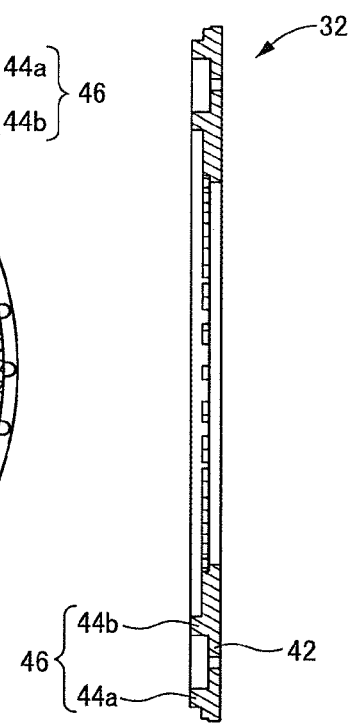

FIG. 5A is a front view of the first member 30 seen from the bonding side which may be also referred to as an inner side or a back-surface side, and FIG. 5B is a cross-sectional view taken along the plane including the axis L. (FIG. 5A may be regarded as a rear view of the first member 30.) As apparent from FIGS. 5A and 5B, the first member 30 has a generally disc-like or hat-like shape. In the first member 30, the mount portion 12 and a radially outer portion 34 located radially outward of the mount portion 12 are formed integrally with each other. The radially outer portion 34 corresponds to a half portion of the sliding portion 14 in its thickness direction, i.e., a portion of the sliding portion 14 which is located on the outer side of the vehicle and on which the sliding surface 26a is formed. FIG. 6A is a front view of the second member 32 seen from the bonding side (the inner side), and FIG. 6B is a cross-sectional view taken along the plane including the axis L. (FIG. 6A may be regarded as a rear view of the second member 32.) As apparent from FIGS. 6A and 6B, the second member 32 has a generally doughnut plate shape and corresponds to another half portion of the sliding portion 14 in its thickness direction, i.e., a portion of the sliding portion 14 which is located on the inner side of the vehicle and on which the sliding surface 26b is formed. In the following explanation, the surface shown in FIG. 5A or FIG. 6A will be referred to as a back surface where appropriate. Illustration of a toothed portion formed at an inner rim of the second member 32 shown in FIG. 6B is omitted in FIG. 4B.

The radially outer portion 34 of the first member 30 includes: a plate portion 36 having a generally doughnut plate shape; and two annular protrusions 38a, 38b disposed concentrically and having mutually different diameters. Each of the protrusions 38a, 38b protrudes from the back surface of the plate portion 36 in the axial direction and continuously extends in the circumferential direction along one circle. (Each of the two annular protrusions 38a, 38b will be simply referred to as a protrusion 38 where appropriate.) The two protrusions 38 constitute a protruding portion 40 of the first member 30. Similarly, the second member 32 includes: a plate portion 42 having a generally doughnut plate shape; and two annular protrusions 44a, 44b disposed concentrically and having mutually different diameters. Each of the protrusions 44a, 44b protrudes from the back surface of the plate portion 42 in the axial direction and continuously extends in the circumferential direction along one circle. (Each of the two annular protrusions 44a, 44b will be simply referred to as a protrusion 44 where appropriate.) The two protrusions 44 constitute a protruding portion 46 of the second member 32.

The two annular protrusions 38a, 38b of the protruding portion 40 of the first member 30 are coaxial with each other. The two annular protrusions 44a, 44b of the protruding portion 46 of the second member 32 are coaxial with each other. When the back surface of the first member 30 and the back surface of the second member 32 are superposed on each other in a state in which the respective axes of the first member 30 and the second member 32 align with each other, the protrusion 38a and the protrusion 44a face and contact each other while the protrusion 38b and the protrusion 44b face and contact each other. That is, crosshatched regions in FIG. 5A are contact surfaces of the protrusions 38a, 38b, and crosshatched regions in FIG. 6A are contact surfaces of the protrusions 44a, 44b. The protrusion 38a and the protrusion 44a have an annular shape of the same diameter, and the protrusion 38b and the protrusion 44b have an annular shape of the same diameter. The protrusions 38a, 38b and the protrusions 44a, 44b protrude respectively from the plate portion 36 and the plate portion 42 by the same amount. That is, protrusions 38a, 38b and the protrusions 44a, 44b have mutually the same height. Further, the protrusions 38a, 38b and the protrusions 44a, 44b have mutually the same width, namely, the same dimension in the radial direction.

In the brake disc 10, the first member 30 and the second member 32 are bonded such that the respective back surfaces thereof are superposed on each other in a state in which the respective axes align with each other. Specifically, the first member 30 and the second member 32 are bonded such that the protrusion 38a and the protrusion 44a are held in contact with each other and such that the protrusion 38b and the protrusion 44b are held in contact with each other. In other words, the first member 30 and the second member 32 are bonded such that protruding ends of the protruding portion 40 and protruding ends of the protruding portion 46 are butted against each other.

Ribs 48a are formed at an outer rim portion of the back surface of each of the first member 30 and the second member 32, so as to be arranged at an equiangular pitch. Ribs 48b are formed at an inner rim portion of each of the first member 30 and the second member 32, so as to be arranged at an equiangular pitch. The sliding portion 14 has a multiplicity of heat dissipation holes 50 formed through the plate portion 36 of the first member 30 and the plate portion 42 of the second member 32 in the axial direction. The mount portion 12 has five mounting holes 52 formed through the first member 30. Hub bolts are inserted into the mounting holes 52.

As apparent from FIGS. 2 and 3, a multiplicity of heat dissipation holes 54a are formed through a bonded portion of the protrusion 38a and the protrusion 44a, so as to be arranged at an equiangular pitch over the entire circumference of the brake disc 10. Similarly, a multiplicity of heat dissipation holes 54b are formed through a bonded portion of the protrusion 38b and the protrusion 44b, so as to be arranged at an equiangular pitch over the entire circumference of the brake disc 10. That is, the heat dissipation holes 54a, 54b are formed through the protruding portions 40, 46 in the radial direction. The heat dissipation holes 54, i.e., the heat dissipation holes 54a and the heat dissipation holes 54b, will be later explained in detail.

[C] Method of Producing Brake Disc

For producing the present brake disc 10, the first member 30 and the second member 32 are initially formed by hot press forging respectively in a first forging step and a second forging step. In the first forging step and the second forging step, a circular, flat plate formed of stainless steel is used as a blank. It is noted that the flat plate as the blank has a uniform thickness and is neither curved nor bent in the thickness direction. The hot press forging is a known ordinary technique, and its detailed explanation is dispensed with.

The heat dissipation holes 50 and the mounting holes 52 of the first member 30 and the heat dissipation holes 50 of the second member 32 may be formed by hot press forging in the first forging step and the second forging step or may be drilled by a drill after the first forging step and the second forging step. It is noted that burrs formed in forging may be removed in a burr removing step.

Subsequently, a bonding step is performed for bonding the first member 30 and the second member 32. In the bonding step, a special friction welding machine 60 shown in FIG. 7 is used for bonding the first member 30 and the second member 32 by friction welding, for instance.

The friction welding machine 60 includes a bed 62, a motor table 66 movable along a rail 64 provided on the bed 62, a motor-table moving device 68 for advancing and retracting the motor table 66, and a support column 70 fixed to and standing on the bed 62. An electric motor 72 is fixed to the motor table 66 in such a posture that an axis of a motor shaft 74 of the electric motor 72 is parallel to the rail 64. To the motor shaft 74, a first holder 76 for holding the first member 30 is attached. The first holder 76 includes a backup plate 80 having a recess 78 in which the mount portion 12 of the first member 30 is to be fitted and a chuck 82 provided on the backup plate 80. The first member 30 is held by the chuck 82 in such a posture that one surface thereof, on which the sliding surface 26a of the plate portion 36 of the radially outer portion 34 is to be formed (i.e., one surface of the first member 30 opposite to the other surface thereof on which the protruding portion 40 is formed), is held in a close contact with the backup plate 80. A second holder 84 for holding the second member 32 is supported by the support column 70 through a clutch mechanism 88. The second holder 84 includes a backup plate 90 and a chuck 92 provided on the backup plate 90. The second member 32 is held by the chuck 92 in such a posture that one surface thereof, on which the sliding surface 26b of the plate portion 42 is to be formed (i.e., one surface of the second member 32 opposite to the other surface thereof on which the protruding portion 46 is formed), is held in a close contact with the backup plate 90. The axis of the first holder 76, the axis of the second holder 84, and the axis of the motor shaft 74 of the electric motor 72 align with one another. In an engaged state of a clutch of the clutch mechanism 88, the second holder 84 is inhibited from rotating about its axis relative to the support column 70. In a disengaged state of the clutch of the clutch mechanism 88, the second holder 84 is allowed to be rotated about its axis relative to the support column 70.

Figure 7A:
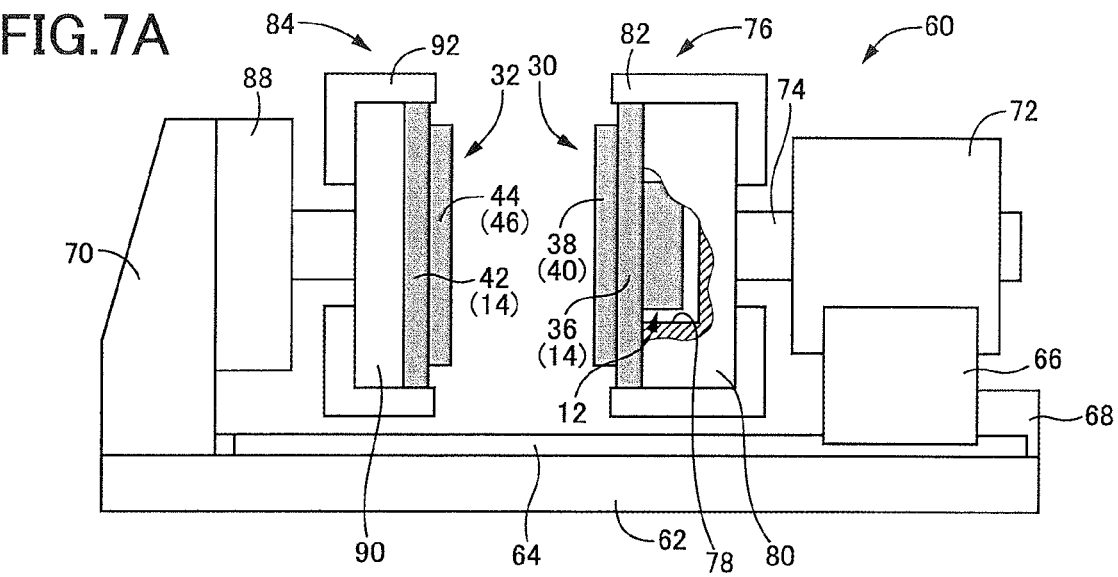
FIGS. 7A-7C are views for explaining a bonding step of bonding the first member and the second member by friction welding.
Figure 7B:
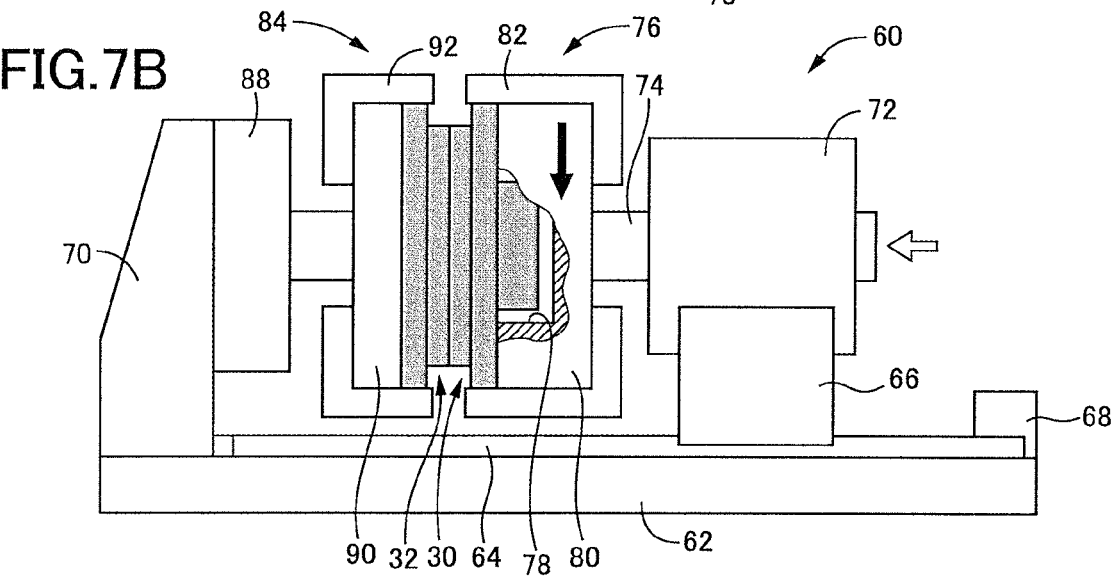

As shown in FIG. 7A, in a state in which the first holder 76 and the second holder 84 are spaced apart from each other, the first member 30 and the second member 32 are respectively held by the first holder 76 and the second holder 84. The first member 30 held by the first holder 76 and the second member 32 held by the second holder 84 are disposed so as to be coaxial with each other. Subsequently, the motor table 66 is advanced by the motor-table moving device 68, as shown in FIG. 7B. The advancing movement of the motor table 66 causes the first member 30 and the second member 32 held by the respective holders 76, 84 to be placed in a state in which the protruding ends of the protruding portion 40 and the protruding ends of the protruding portion 46 are held in contact with each other. (This state will be hereinafter referred to as a "standby state" where appropriate.) In the standby state, the first member 30 and the second member 32 are pressed against each other with a slight pressing force.

As shown in FIG. 7B, in the standby state, the engaged state of the clutch of the clutch mechanism 88 is established so as to inhibit the second member 32 from rotating about its axis, and the first member 30 is rotated at a high speed by supplying a predetermined current to the electric motor 72.

Figure 7C:
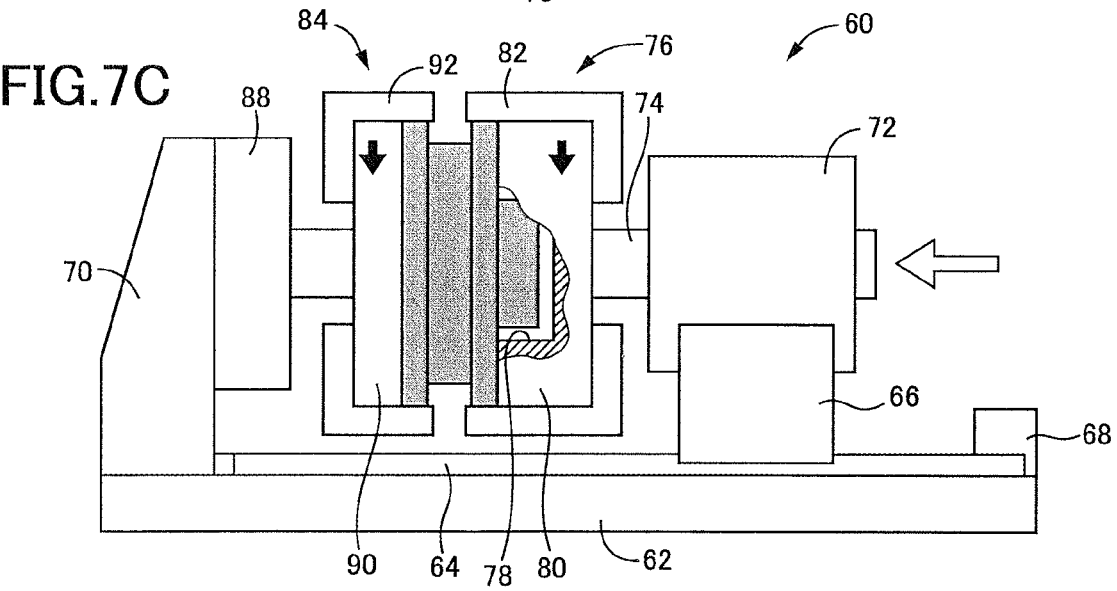

The high-speed rotation of the first member 30 causes a frictional heat to be generated between the mutually contacting protruding ends of the protruding portions 40, 46, so that the protruding ends of the protruding portions 40, 46 are softened to such an extent that the protruding ends are about to be molten or the protruding ends of the protruding portions 40, 46 are slightly molten. In this state, the first member 30 is further advanced to a set position by the motor-table moving device 68, as shown in FIG. 7C, so as to increase the pressing force by which the first member 30 and the second member 32 are pressed against each other. At the same time, the disengaged state of the clutch of the clutch mechanism 88 is established, and the current supply to the electric motor 72 is stopped. As a result, as shown in FIG. 7C, the first member 30 and the second member 32 are rotated together by inertia, and the softened or molten protruding ends are cooled during the rotation by the inertia, so that the first member 30 and the second member 32 are bonded to each other through the protruding portions 40, 46. Specifically, the annular protrusions 38a, 38b that constitute the protruding portion 40 of the first member 30 and the annular protrusions 44a, 44b that constitute the protruding portion 46 of the second member 32 are bonded at the protruding ends. The set position of the first member 30 indicated above is set such that a distance between the plate portion 36 of the radially outer portion 34 of the first member 30 and the plate portion 42 of the second member 32 is equal to an appropriate distance, namely, such that a distance between the surface of the plate portion 36 on which the sliding surface 26a is to be formed and the surface of the plate portion 42 on which the sliding surface 26b is to be formed is equal to an appropriate distance.

After the bonding step described above, a heat-dissipation-hole drilling step of drilling the heat dissipation holes 54 is performed. This step is performed as follows. A bonded product obtained by bonding the first member 30 and the second member 32 as described above (hereinafter referred to as the "brake disc 10" where appropriate for convenience sake) is held by an index table, for instance. As shown in FIG. 8A, a drill 94 is radially advanced from the outer circumference of the brake disc 10, so as to form the heat dissipation hole 54a through the bonded portion of the protrusions 38a, 44a (i.e., the radially outer bonded portion of the protruding portions 40, 46) and so as to form the heat dissipation hole 54b through the bonded portion of the protrusions 38b, 44b (i.e., the radially inner bonded portion of the protruding portions 40, 46), such that the heat dissipation holes 54a, 54b are drilled coaxially at one time. The drilling for forming one heat dissipation hole 54a and one heat dissipation hole 54b is performed over the entire circumference of the brake disc 10 while the index table is intermittently rotated at a predetermined angular pitch. In this way, the heat-dissipation-hole drilling step is performed. FIG. 8B shows the brake disc 10 before the heat-dissipation-hole drilling step is performed, and FIG. 8C shows the brake disc 10 after the heat-dissipation-hole drilling step has been performed.

A sliding-surface forming step of forming the sliding surfaces 26a, 26b by grinding is performed after the heat-dissipation-hole drilling step. Alternatively, the sliding-surface forming step may be performed prior to the heat-dissipation-hole drilling step after the bonding step has been performed. In this step, a surface grinder is used to form the sliding surfaces 26a, 26b. Thus, the brake disc 10 shown in FIG. 8D is produced.

The present producing method enables the brake disc 10 to be easily produced by simple processes such as forging and bonding without any cumbersome process such as casting. Further, the brake disc 10 is produced by press forging and friction welding, thus facilitating production of the brake disc having high dimensional accuracy. In the present embodiment, in particular, the protruding portion 40, 46 is formed on both of the first member 30 and the second member 32, and the protruding ends of the respective protruding portions 40, 46 are bonded. Thus, unlike an arrangement in which the plate portions 36, 42 are directly bonded, the plate portions 36, 42 are less susceptible to the heat generated in the bonding, so that the plate portions 36, 42 are less likely to suffer from thermal strain, for instance.

[D] Advantages of Brake Disc

The present brake disc 10 is formed by bonding the first member 30 and the second member 32 each in the form of a relatively thin plate, achieving light weight. In the sliding portion 14 required to have a relatively large thickness, the protruding portions 40, 46 bonded to each other function as a spacer between the plate portion 36 and the plate portion 42. Thus, the requirement for the sliding portion 14 is met with simple means.

In the radially outer and inner bonded portions of the protruding portions 40, 46, namely, in the bonded portions of the protrusions 38, 44, the heat dissipation holes 54 are formed through the protruding portions 40, 46 so as to extend in the radial direction. As understood from FIG. 8A, the heat dissipation holes 54 have a function of dissipating the heat in a space S defined by the protruding portions 40, 46 and the plate portions 36, 42. That is, the heat dissipation holes 54 have a function of producing air flows in the radial direction utilizing a centrifugal force by the rotation of the wheel, for preventing the air heated due to generation of a wheel braking force from remaining in the space S.

[E] Modifications of Protruding Portion and Heat Dissipation Hole

Figure 9C:
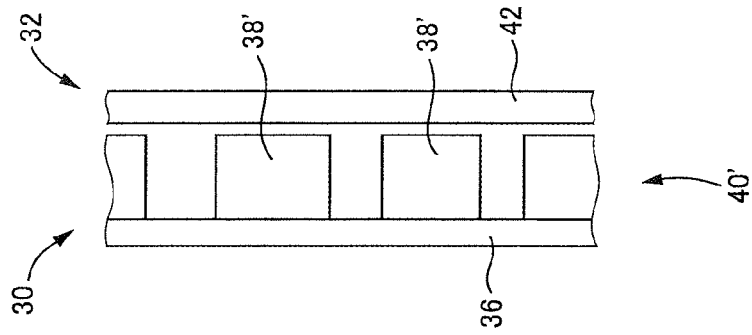
FIGS. 9A-9C are schematic views partially showing brake discs according to respective modifications.

In the brake disc 10 according to the illustrated embodiment, the heat dissipation holes 54 are formed in each of the radially outer and inner bonded portions of the protruding portions 40, 46 so as to be located at the central position in the thickness direction of the sliding portion 14. As shown in FIG. 9A, heat dissipation holes 54', 54" may be formed so as to be shifted toward the plate portion 36 of the first member 30 or toward the plate portion 42 of the second member 32. According to this configuration, the heat dissipation holes 54', 54" may be formed before the bonding step, specifically, the heat dissipation holes 54', 54" may be formed respectively in the first forging step and the second forging step, instead of drilling the heat dissipation holes 54', 54" after the bonding step, for instance. Thus, the brake disc 10 can be more easily produced. In FIG. 9A, the heat dissipation holes 54' shifted toward the plate portion 36 of the first member 30 and the heat dissipation holes 54" shifted toward the plate portion 42 of the second member 32 are arranged in a zigzag fashion. Only the heat dissipation holes 54' or only the heat dissipation holes 54" may be formed.

Figure 9B:
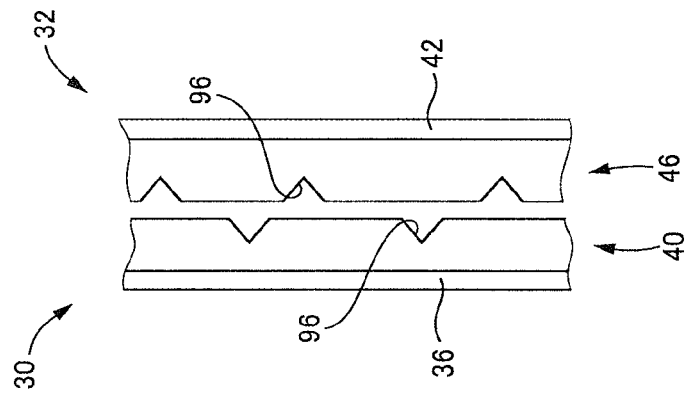
Figure 9A:
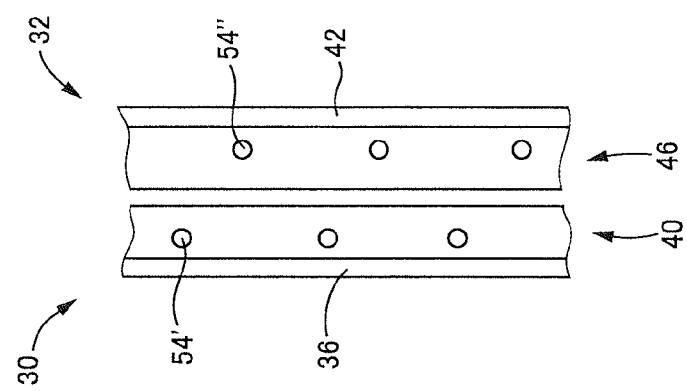

As shown in FIG. 9B, notches (cutouts) 96 may be formed at at least one of the protruding ends of the protruding portion 40 of the first member 30 and the protruding ends of the protruding portion 46 of the second member 32. After the first member 30 and the second member 32 are bonded, the notches 96 function similarly to the heat dissipation holes 54 of the brake disc 10 of the illustrated embodiment. The employment of the notches 96 makes it possible to omit the heat-dissipation-hole drilling step to be performed after the bonding step. In FIG. 9B, the notches 96 are formed at the protruding ends of both of the protruding portion 40 of the first member 30 and the protruding portion 46 of the second member 32. The notches may be formed at the protruding ends of only one of the protruding portion 40 and the protruding portion 46.

In the brake disc 10 of the illustrated embodiment, the annular protrusions (38 or 44) are formed as the protruding portion (40 or 46) on both of the first member 30 and the second member 32, and the protruding ends of the protruding portions 40, 46 are bonded. For instance, the protruding portion may be formed on only one of the first member 30 and the second member 32, and the protruding portion of the one of the first member 30 and the second member 32 may be bonded to the plate portion of the other of the first member 30 and the second member 32. Specifically, as shown in FIG. 9C, there may be formed, only on the first member 30, a protruding portion 40' constituted by a plurality of protrusions 38' arranged along one circle or a plurality of circles with mutually different diameters, so as to be spaced apart from one another. In this configuration, the protruding ends of the plurality of protrusions 38' and the plate portion of the second member 32 are bonded. Owing to the thus formed protruding portion 40', a space between any adjacent two of the protrusions 38' function similarly to the heat dissipation holes 54, namely, such a space has a heat dissipating function. In FIG. 9C, the protruding portion 40' is constituted by the plurality of protrusions 38' arranged along one circle or a plurality of circles with mutually different diameters, so as to be spaced apart from one another. If consideration is given only to the spacer function of the protruding portion, a continuous annular protrusion may be formed on only one of the first member 30 and the second member 32.

What is claimed is:

1. A brake disc to be mounted on an axle hub, the brake disc including a pair of sliding surfaces with which friction members respectively come into a sliding contact and which face in mutually opposite directions,
    wherein the brake disc includes:
        a first member formed in a disc-like shape and including a mount portion through which the brake disc is mounted on the an axle hub and a radially outer portion located radially outward of the mount portion, one of the sliding surfaces being formed on the radially outer portion; and
        a second member formed in a doughnut plate shape, the other of the sliding surfaces being formed on the second member, and
    wherein the first member and the second member are bonded to each other through a protruding portion formed on one of the radially outer portion of the first member and the second member and protruding toward the other of the radially outer portion of the first member and the second member,
    wherein the protruding portion includes a plurality of annular protrusions disposed concentrically and having mutually different diameters, and
    wherein a plurality of heat dissipation holes are formed penetrating the plurality of annular protrusions in a radial direction of the brake disc and are arranged over an entire circumference of the brake disc.

2. The brake disc according to claim 1, wherein the first member and the second member are bonded by friction welding.

3. The brake disc according to claim 1, wherein the first member and the second member are formed of stainless steel.

4. The brake disc according to claim 1, further comprising a plurality of additional heat dissipation holes formed between the plurality of annular protrusions in a radial direction of the brake disc and arranged over an entire circumference of the brake disc.

5. A method of producing a brake disc to be mounted on an axle hub, the brake disc including a pair of sliding surfaces with which friction members respectively come into a sliding contact and which face in mutually opposite directions, the method comprising:
    a first forging step of forging a first member having a disc-like shape and including a mount portion through which the brake disc is mounted on the axle hub and a radially outer portion located radially outward of the mount portion, one of the sliding surfaces being formed on the radially outer portion;
    a second forging step of forging a second member having a doughnut plate shape, the other of the sliding surfaces being formed on the second member; and
    a bonding step of bonding the first member and the second member,
        wherein, in at least one of the first forging step and the second forging step, a protruding portion is formed on one of the radially outer portion of the first member and the second member, so as to protrude toward the other of the radially outer portion of the first member and the second member, the protruding portion including a plurality of annular protrusions disposed concentrically and having mutually different diameters, and
    wherein, in the bonding step, the first member and the second member are bonded to each other through the plurality of annular protrusions, and
    wherein the method further comprises a heat-dissipation-hole drilling step of drilling a plurality of heat dissipation holes penetrating the plurality of annular protrusions in a radial direction of the brake disc over an entire circumference of the brake disc.

6. The method according to claim 5, wherein, in the bonding step, the first member and the second member are bonded by friction welding.

* * * * *